US011162871B2

(12) United States Patent
Preston et al.

(10) Patent No.: US 11,162,871 B2
(45) Date of Patent: Nov. 2, 2021

(54) FRAME ASSEMBLY FOR VEHICLE TEST FIXTURE AND METHODS OF ASSEMBLING SAME

(71) Applicant: Honda Motor Co., Ltd., Tokyo (JP)

(72) Inventors: Derek Christopher Preston, Kenton, OH (US); Angelo Arthur Agostinelli, Kenton, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 16/781,667

(22) Filed: Feb. 4, 2020

(65) Prior Publication Data

US 2021/0239571 A1    Aug. 5, 2021

(51) Int. Cl.
  *G01M 17/007* (2006.01)
  *G01D 11/30* (2006.01)
(52) U.S. Cl.
  CPC ........... *G01M 17/007* (2013.01); *G01D 11/30* (2013.01)
(58) Field of Classification Search
  CPC .............................. G01M 17/007; G01D 11/30
  See application file for complete search history.

(56) References Cited

U.S. PATENT DOCUMENTS

| 6,681,620 | B2 | 1/2004 | Sakamoto et al. |
| 7,708,330 | B2 | 5/2010 | Staehle |
| 8,051,936 | B1 | 11/2011 | Hebert et al. |
| 9,823,685 | B2 | 11/2017 | Bledsoe et al. |
| 10,974,779 | B2* | 4/2021 | Maistros, Jr. ............ B25H 5/00 |

FOREIGN PATENT DOCUMENTS

| JP | 04198538 B2 | 12/2008 |
| JP | 2010091519 A | 4/2010 |

OTHER PUBLICATIONS

"Pedal Robot" https://www.abdynamics.com/en/products/track-testing/driving-robots/pedal-robots (Accessed Oct. 21, 2019). 4 Pages.
"Ab Dynamics Pedal Robots" https://www.datrontechnology.co.uk/pedalrobots/ (Accessed Oct. 21, 2019). 3 pages.
"Robot: Targeton Its Back" https://www.gpsworld.com/robot-target-on-its-back/, Aug. 1, 2013. (Accessed Oct. 21, 2019). 7 Pages.

* cited by examiner

*Primary Examiner* — Jamel E Williams
(74) *Attorney, Agent, or Firm* — Armstrong Teasdale LLP (57) ABSTRACT

A frame assembly for mounting a test fixture includes a plurality of mounting feet configured to attach to a floorboard of a vehicle and a frame body coupled to the plurality of mounting feet. The frame body includes first and second side frame members spaced laterally apart from each other, and at least one cross frame member that extends between the first and second side frame members. The frame assembly further includes an actuator mounting assembly coupled to the frame body for coupling to the test fixture, and a sensor mounting arm coupled to the actuator mounting assembly. The sensor mounting arm extends from a first end coupled to the actuator mounting assembly, away from the frame body, to a second, free end configured for attachment to a position sensor.

20 Claims, 8 Drawing Sheets

FRAME ASSEMBLY FOR VEHICLE TEST FIXTURE AND METHODS OF ASSEMBLING SAME

BACKGROUND

The field of the disclosure relates generally to vehicle test assemblies, and, more particularly, to frame assemblies for use in mounting vehicle test fixtures within a vehicle.

Vehicles, such as automobiles, include pedals to control various operations of the vehicle, such as acceleration, braking, and actuation of a clutch. Vehicle pedals commonly include, for example, an acceleration pedal, a brake pedal, and a clutch pedal.

It is sometimes desirable to test vehicle pedals, for example, to ensure proper operation of the pedal and components of the vehicle coupled to the pedal. As such, vehicle test fixtures may be mounted in the vehicle to test operation of the pedals. At least some known mounting frames for mounting test fixtures within the vehicle allow inadvertent movement of the test fixture, for example, during testing involving heavy loads. Additionally, at least some known mounting frames provide little or no adjustability of the test fixture, thereby limiting or reducing the accuracy and precision of test measurement data collected by the test fixture.

BRIEF DESCRIPTION

In one aspect, a frame assembly for mounting a test fixture includes a plurality of mounting feet configured to attach to a floorboard of a vehicle and a frame body coupled to the plurality of mounting feet. The frame body includes first and second side frame members spaced laterally apart from each other, and a cross frame member that extends between the first and second side frame members. The frame assembly further includes an actuator mounting assembly coupled to the frame body for coupling to the test fixture, and a sensor mounting arm coupled to the actuator mounting assembly. The sensor mounting arm extends from a first end coupled to the actuator mounting assembly, away from the frame body, to a second, free end configured for attachment to a position sensor.

In another aspect, a test assembly for a vehicle includes a frame assembly and a test fixture. The frame assembly includes a plurality of mounting feet fixed to a floorboard of a vehicle, a frame body coupled to the plurality of mounting feet and extending at least partially around a seat of the vehicle, an actuator mounting assembly coupled to the frame body, and a sensor mounting arm coupled to the actuator mounting assembly. The test fixture includes a robot pedal actuator adjustably coupled to the frame body by the actuator mounting assembly, and a position sensor adjustably coupled to the frame body by the sensor mounting arm. The robot pedal actuator is operable to depress a pedal of the vehicle, and the position sensor is configured to measure displacement of the pedal.

In yet another aspect, a method of assembling a test assembly for a vehicle includes coupling a plurality of mounting feet of a frame assembly to a floorboard of the vehicle. The frame assembly includes a frame body coupled to the plurality of mounting feet, an actuator mounting assembly coupled to the frame body, and a sensor mounting arm coupled to the actuator mounting assembly. The method further includes coupling a robot pedal actuator to the actuator mounting assembly such that the robot pedal actuator is adjustable relative to the frame body, and coupling a position sensor to the sensor mounting arm such that the position sensor is adjustable relative to the frame body. The robot pedal actuator is operable to depress a pedal of the vehicle, and the position sensor is configured to measure displacement of the pedal.

DETAILED DESCRIPTION

Frame assemblies used to mount vehicle test fixtures within a vehicle are described herein. Exemplary embodiments of the frame assemblies facilitate collecting precise and accurate test measurement data from vehicle test fixtures, for example, by providing a rigid connection to the vehicle, and by enabling a mounting position of components of the test fixture to be selectively adjusted vertically and horizontally. Various embodiments of frame assemblies and methods of assembling and using the same are provided. It should be noted that although the various embodiments are described in connection with the automotive industry, such as for use with testing automobile pedals, one or more embodiments may be implemented in different industries and/or for different applications including, for example, use with aircraft, watercraft, and/or recreational vehicles (e.g., all-terrain vehicles). Various embodiments will be better understood when read in conjunction with the appended drawings.

Figure 1:
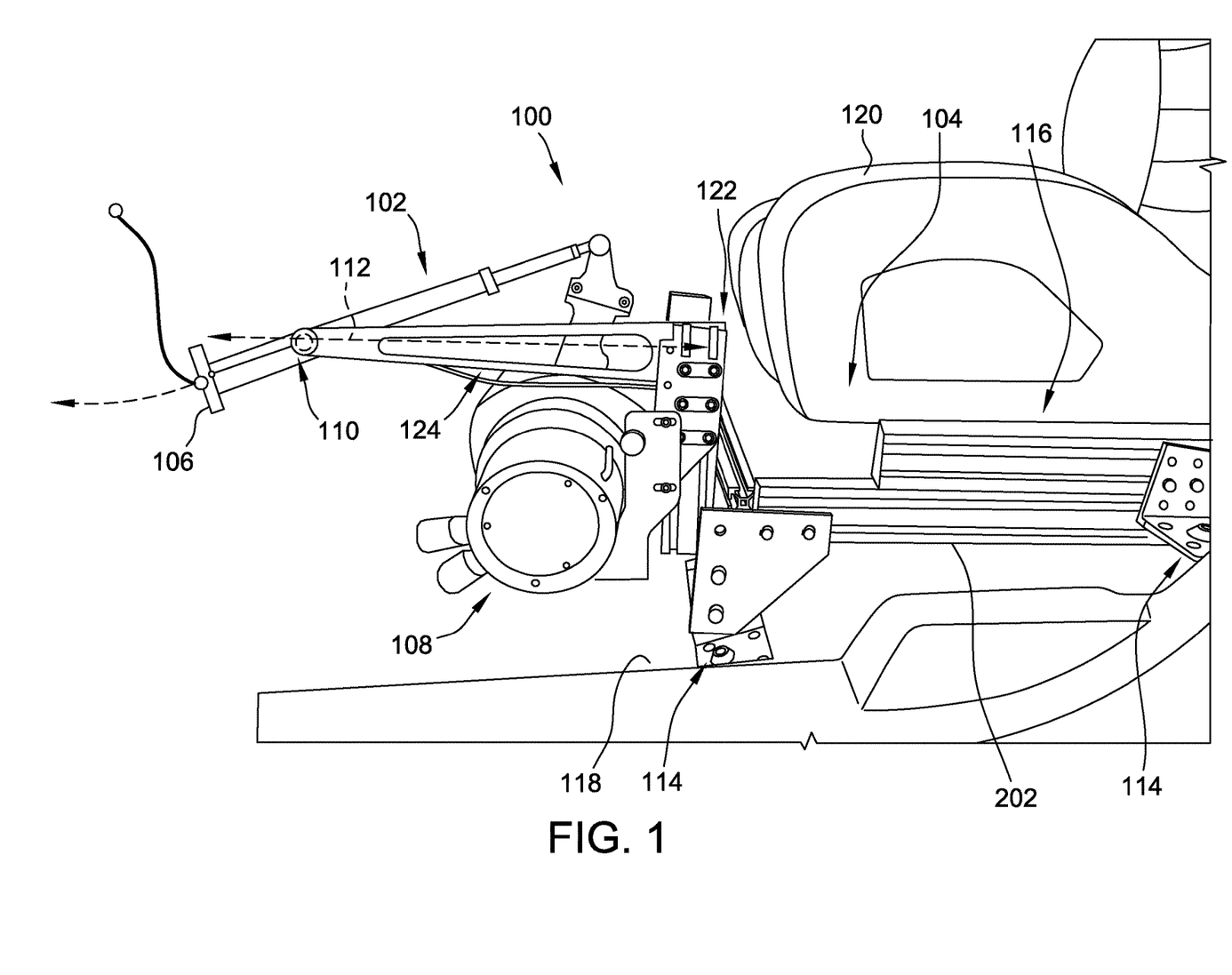
FIG. 1 is a side view of an exemplary test assembly installed in a vehicle, wherein the test assembly includes a frame assembly and a vehicle test fixture.
Figure 2:
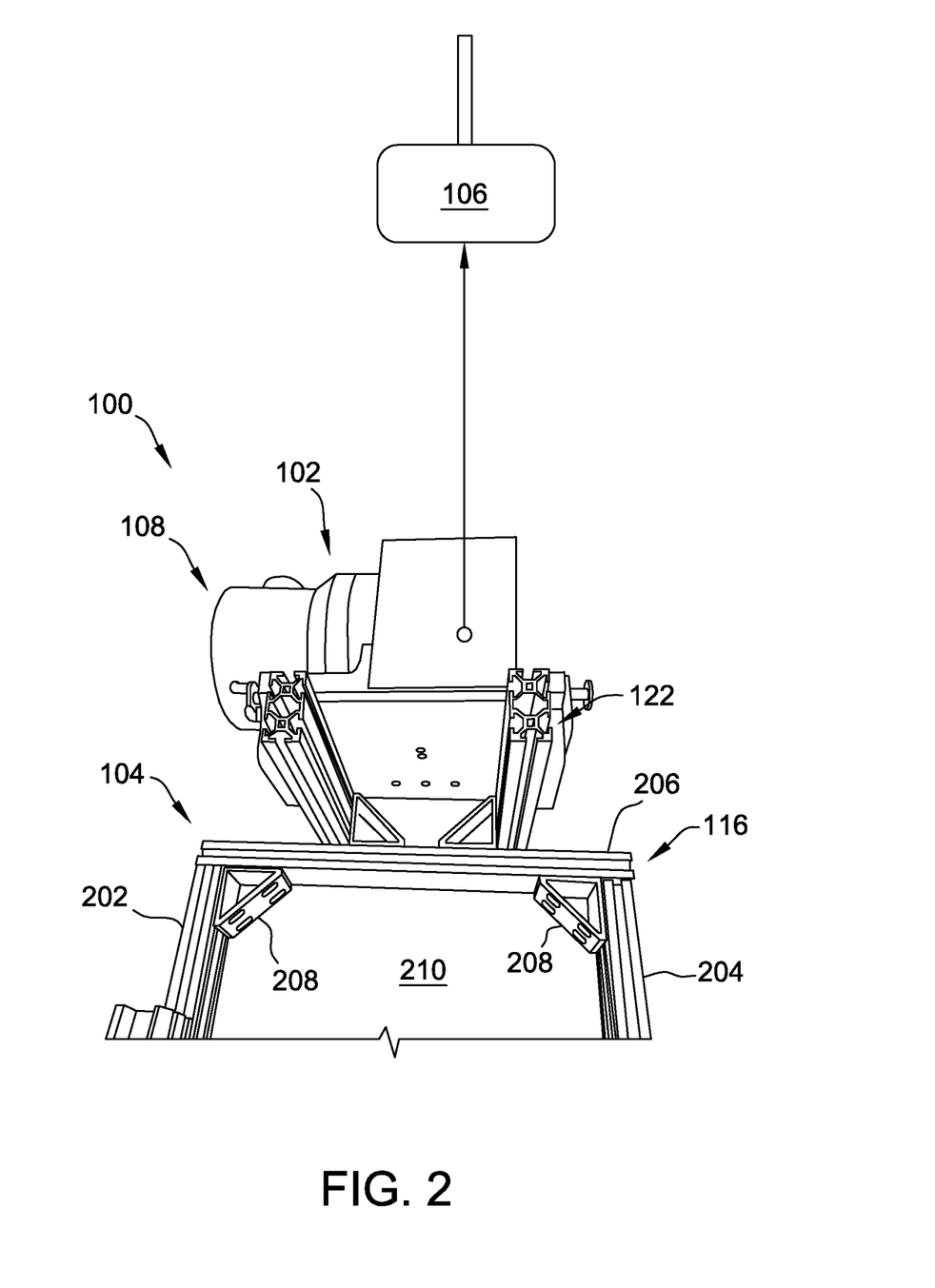
FIG. 2 is a top view of the test assembly shown in FIG. 1.

FIG. 1 is a side view of an exemplary test assembly 100 for a vehicle. FIG. 2 is a top view of the test assembly 100. As shown in FIGS. 1 and 2, the test assembly 100 includes a vehicle test fixture 102 and a frame assembly 104 for use in mounting the vehicle test fixture 102 within the vehicle. As described in more detail herein, the frame assembly 104 provides a rigid mounting fixture for the vehicle test fixture 102, and facilitates adjustably mounting the vehicle test fixture 102 within the vehicle such that the vehicle test fixture 102 can be positioned and oriented to provide accurate and precise test measurements.

In the exemplary embodiment, the vehicle test fixture 102 is a pedal test fixture that selectively depresses a pedal 106 of the vehicle (shown schematically in FIGS. 1 and 2), for example, to determine performance or operating characteristics of the vehicle (e.g., brake performance). The vehicle test fixture 102 shown in FIG. 2 is positioned and oriented to depress a brake pedal 106 of the vehicle, although in other embodiments the vehicle test fixture 102 may be configured (e.g., positioned and oriented) to depress a pedal other than or in addition to the brake pedal 106, such as an accelerator pedal and/or a clutch pedal.

In the exemplary embodiment, the vehicle test fixture 102 includes a robot pedal actuator 108 that is operable to depress the pedal 106, and a position sensor 110 that measures displacement of the pedal 106. With additional reference to FIG. 3, the robot pedal actuator 108 includes an actuator 302 and an actuating arm 304 having a first end 306 coupled to the actuator 302, and a second, distal end or foot 308 coupled to the pedal 106. In the exemplary embodiment, the actuator 302 is a rotary actuator that includes an electric motor. In other embodiments, the actuator 302 may be any other actuator other than a rotary actuator that enables the robot pedal actuator 108 to function as described herein.

Figure 3:
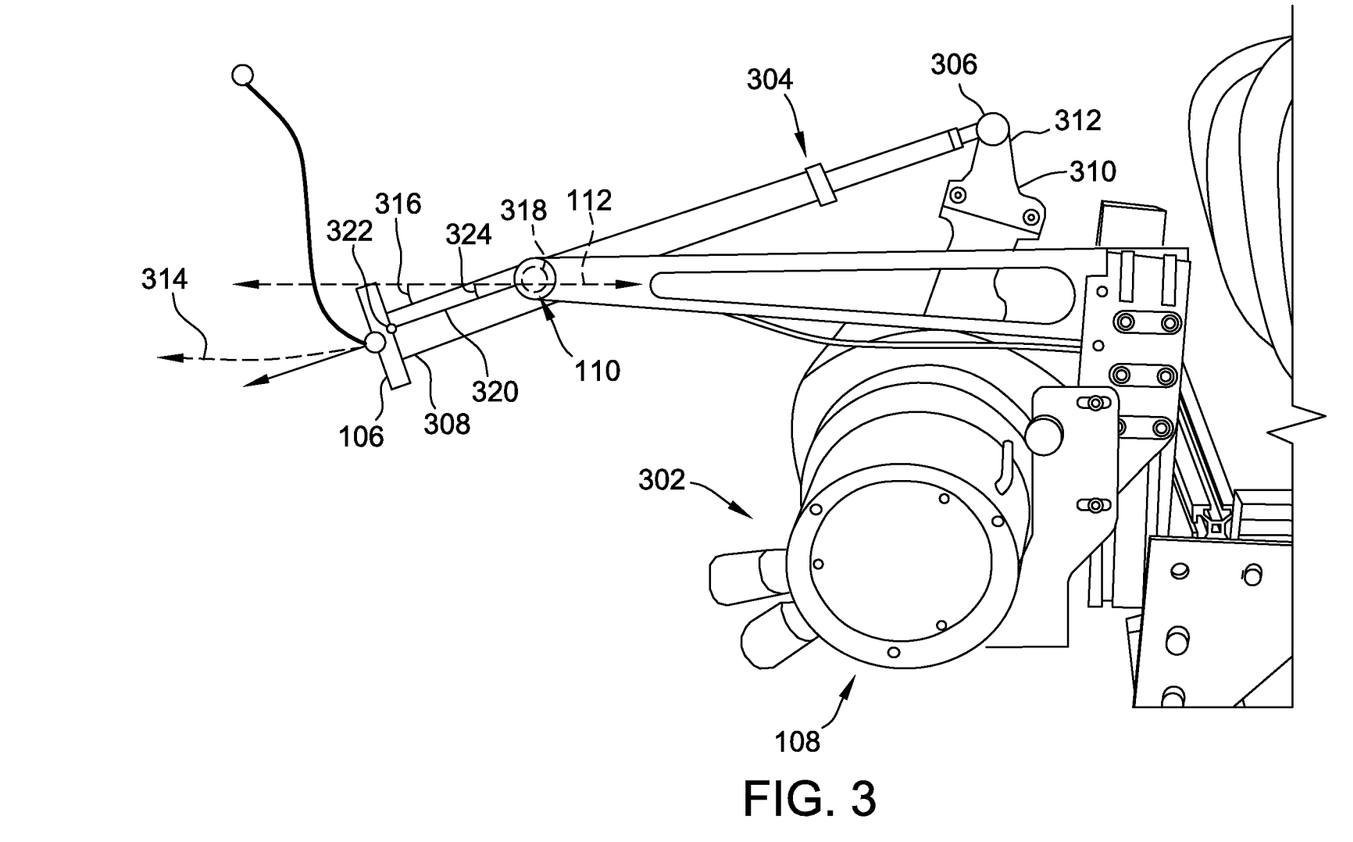
FIG. 3 is an enlarged side view of the test assembly shown in FIG. 1 and illustrating details of the test fixture.

The actuating arm 304 is coupled to the actuator 302 via a linkage 310. More specifically, in the exemplary embodiment, the first end 306 of the actuating arm 304 is pivotably coupled to a distal end 312 of the linkage 310 such that the actuating arm 304 can pivot relative to the linkage 310 as the actuator 302 and the linkage 310 rotate to displace the actuating arm 304. The second end 308 of the actuating arm 304 is pivotably coupled to the pedal 106 by a suitable coupling, such as a universal joint (not shown), located at the foot 308 of the actuating arm 304. Actuation of the actuator 302 causes actuating arm 304 to apply pressure to the pedal 106 such that the pedal 106 is displaced along a pedal motion path 314. In the exemplary embodiment, path 314 is arcuate.

As show in FIG. 3, the actuating arm 304 is oriented at a pitch angle 316 relative to a fore-aft direction 112 of the vehicle. In some embodiments, the pitch angle 316 of the actuating arm 304 may be selectively adjusted using the frame assembly 104, for example, so that the actuating arm 304 is oriented to apply force to the pedal 106 along a direction substantially parallel to the pedal motion path 314. That is, the actuating arm 304 can be selectively adjusted to enable force to be applied parallel to a tangent line of the pedal motion path 314 at the pedal's initial or starting position.

In the exemplary embodiment, the position sensor 110 is a cable-actuated position sensor (also known as a string potentiometer or "string pot") that measures linear displacement of the pedal 106 and the velocity at which the pedal 106 is displaced by the robot pedal actuator 108. More specifically, in the exemplary embodiment, the position sensor 110 includes a spool 318 and a cable 320 wound about the spool 318. The cable 320 extends from the spool 318 to a distal end 322 of the cable 320 connected to the pedal 106. As shown in FIG. 3, the cable 320 is oriented at a pitch angle 324 relative to the fore-aft direction 112 of the vehicle. As the pedal 106 is depressed by the robot pedal actuator 108, the cable 320 extends and retracts, causing corresponding rotation of the spool 318. A sensor (not shown), such as a rotary encoder, measures rotation of the spool 318, and determines linear displacement and velocity of the pedal 106.

The vehicle test fixture 102 may also include a suitable controller (e.g., a programmable logic controller, not shown) to control actuation of the vehicle test fixture 102. In such embodiments, the vehicle test fixture 102 may be programmed or otherwise configured to depress the pedal 106 according to a pre-programmed schedule. In some embodiments, for example, the vehicle test fixture 102 may be programmed to repeatedly depress the pedal 106 at a set interval for a set number of depressions. Additionally or alternatively, the vehicle test fixture 102 may be programmed to depress the pedal 106 with substantially the same magnitude and/or with a varying magnitude. Additionally or alternatively, the vehicle test fixture 102 may include a wireless communication interface to enable remote control of the vehicle test fixture. The controller of the vehicle test fixture 102 may also include memory or other suitable storage device(s) for receiving, recording, and/or storing test measurement data collected by the position sensor 110.

Referring again to FIGS. 1 and 2, in the exemplary embodiment, the frame assembly 104 includes a plurality of mounting feet 114 and a frame body 116 coupled to the plurality of mounting feet 114. The mounting feet 114 are coupled to a floorboard 118 of the vehicle to provide a rigid structural connection between the frame body 116 and the vehicle. In the exemplary embodiment, the frame assembly 104 includes four mounting feet 114, although only two are visible in FIG. 1. In other embodiments, frame assembly 104 may include more than or fewer than four mounting feet.

Figure 4:
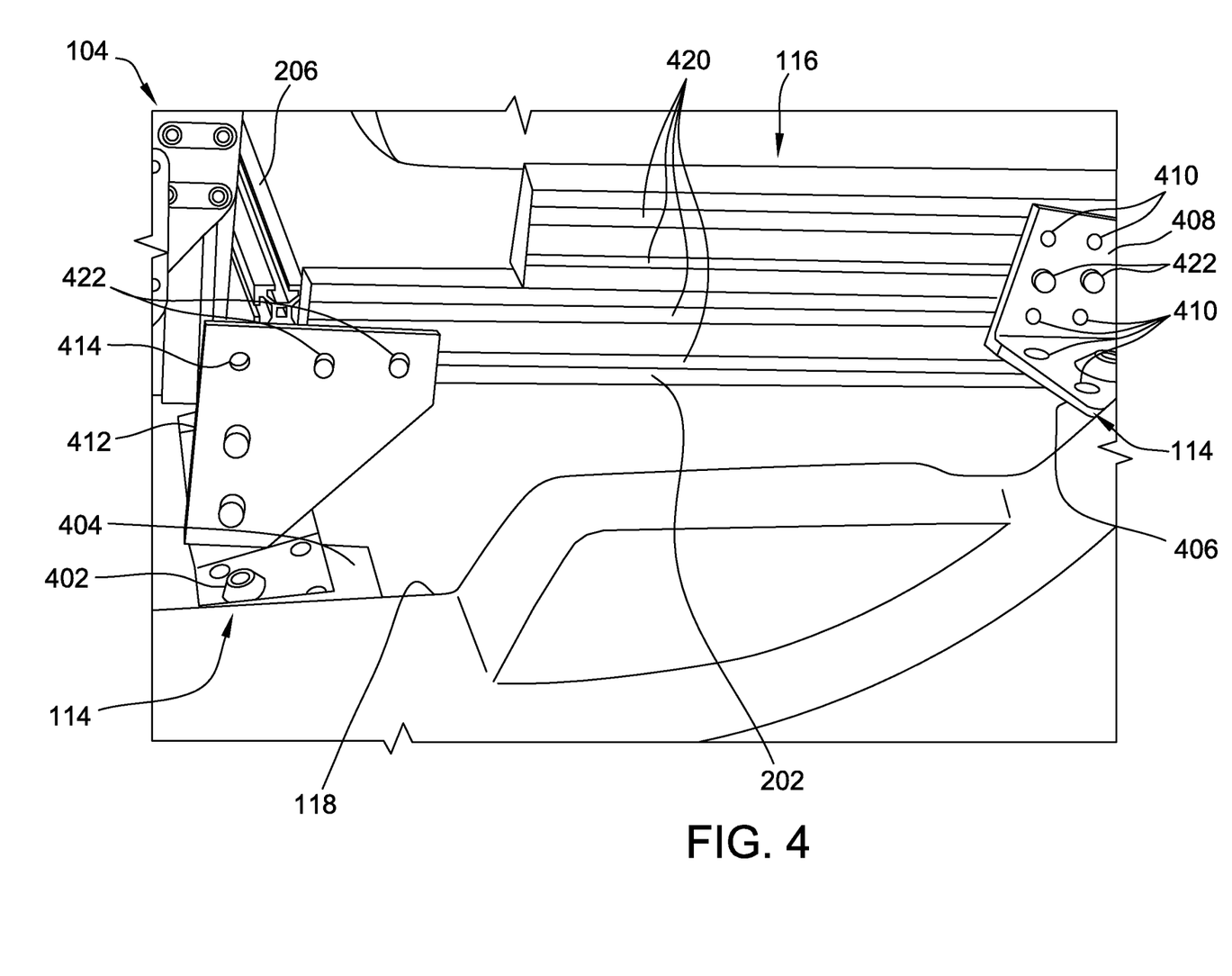
FIG. 4 is an enlarged side view of the frame assembly shown in FIG. 1 and illustrating details of exemplary mounting feet and an exemplary frame body of the frame assembly.

With additional reference to FIG. 4, in the exemplary embodiment, each mounting foot 114 is secured directly to the vehicle floorboard 118 by at least one fastener 402. The mounting feet 114 may be secured to the vehicle floorboard 118 using any suitable fasteners that enable the test assembly 100 to function as described herein, including, for example and without limitation, bolts, screws, clips, clamps, rivets, and combinations thereof.

In the exemplary embodiment, each mounting foot 114 is fixed or secured to vehicle seat mounts 404 on the vehicle floorboard 118. That is, the mounting feet 114 are coupled to mounts 404 on the vehicle floorboard 118 to which a vehicle seat (e.g., vehicle seat 120) is connected when the vehicle is assembled. Thus, in some embodiments, the test assembly 100 is used on a vehicle prior to the vehicle being fully assembled (i.e., prior to the driver seat being installed). Alternatively, the test assembly 100 may be used on a vehicle after assembly, for example, by disconnecting the driver seat from the vehicle seat mounts 404. In the exemplary embodiment, the fastener 402 used to secure the mounting feet 114 to the vehicle floorboard 118 is an original equipment manufacturer (OEM) fastener that is also used to secure the vehicle seat to the vehicle seat mounts 404.

In the exemplary embodiment, each mounting foot 114 includes an L-bracket having a base plate 406 and a vertical plate 408 extending upward from the base plate 406. In other embodiments, not all of the mounting feet 114 may include a vertical plate 408. In some embodiments, for example, only the fore-most mounting feet 114 include a vertical plate 408. In other embodiments, only the rear-most mounting feet 114 include a vertical plate 408. Each base plate 406 and each vertical plate 408 includes a plurality of fastener openings 410 sized and shaped to receive a fastener (e.g., fastener 402) therein. The illustrated mounting feet 114 include five fastener openings 410 in the base plate 406, and six fastener openings 410 in the vertical plate 408. In some embodiments, one or more of the mounting feet 114 may include more fastener openings 410 than are needed or used to secure the mounting feet 114 to the vehicle floorboard 118. In the illustrated embodiment, for example, each mounting foot 114 is secured to the vehicle floorboard 118 with one fastener. The additional fastener openings 410 provide alternative fastener locations and provide flexibility in the mounting position and orientation of the mounting feet 114 within the vehicle, thereby making the frame assembly 104 more adaptable to different vehicle seat mount configurations.

In some embodiments, the mounting feet 114 may include components in addition to, or as an alternative to, L-brackets to facilitate connecting the frame body 116 to the mounting feet 114. In the illustrated embodiment, for example, the foremost mounting feet 114 include angle plates 412 that extend from the vertical plate 408 to the frame body 116 to connect the frame body 116 to the mounting feet 114. The angle plate 412 includes a plurality of fastener openings 414 sized and shaped to receive fasteners (e.g., fasteners 422) therein to secure the angle plate 412 to the vertical plate 408 of the mounting foot 114 and to the frame body 116.

With additional reference to FIGS. 1 and 2, the frame body 116 includes a first side frame member 202, a second side frame member 204, and at least one cross frame member 206 that is coupled to, and extends between, the first and second side frame members 202 and 204. The first and second side frame members 202 and 204 are spaced laterally apart from one another, and are oriented generally parallel to the fore-aft direction 112 of the vehicle in the exemplary embodiment. Moreover, in the exemplary embodiment, the cross frame member 206 is coupled to the first and second side frame members 202 and 204 at the foremost end of each of the first and second side frame members 202 and 204 by angle brackets 208 (shown in FIG. 2). In other embodiments, the cross frame member 206 may be coupled to the first and second side frame members 202 and 204 at a location other than the foremost end. Additionally, in the exemplary embodiment, the cross frame member 206 is a first cross frame member 206, and the frame body 116 includes a second cross frame member 209 coupled to, and extending between, the first and second side frame members 202 and 204 at a rearmost end of the first and second side frame members 202 and 204. The second cross frame member 209 has the same configuration as the first cross frame member 206. In other embodiments, only a single cross frame member 206 is used.

As shown in FIGS. 1 and 2, the exemplary frame body 116, when assembled, has a generally square or rectangular configuration, and extends at least partially around a seat 120 of the vehicle. More specifically, the frame body 116 (specifically, the first and second side frame members 202 and 204, and the first and second cross frame members 206 and 209) extends about the perimeter of, and enclose an interior space 210 (shown FIG. 2). When the frame assembly 104 is assembled in a vehicle, the seat 120 of the vehicle is within the interior space 210, and is at least partially surrounded by the frame body 116. In the exemplary embodiment, the vehicle seat 120 is completely surrounded by the frame body 116. In other embodiments, the frame body 116 may have a configuration other than square or rectangular, and/or may not extend around the vehicle seat 120.

Referring again to FIG. 4, each of the first and second side frame members 202 and 204 includes a plurality of vertically-spaced elongate fastener slots 420 that extend substantially parallel to the fore-aft direction 112. Each fastener slot 420 is sized and shaped to receive and retain one end of a fastener 422 therein. In the exemplary embodiment, each of the first and second side frame members 202 and 204 includes at least two fastener slots 420 such that the first and second side frame members 202 and 204 can be coupled to the mounting feet 114 at different heights. That is, a height or spacing of frame body 116 from mounting feet 114 can be selectively adjusted by coupling the first and second side frame members 202 and 204 to the mounting feet 114 using different fastener slots 420. The first and second side frame members 202 and 204 in the exemplary embodiment include four fastener slots 420, although the first and second side frame members 202 and 204 may include more than or less than four fastener slots 420 in other embodiments.

The elongate fastener slots 420 also enable a fore-aft position of the frame body 116 to be selectively adjusted. More specifically, one or more of the mounting feet 114 can be coupled to the first and second side frame members 202 and 204 at different fore-aft positions along the first and second side frame members 202 and, 204. In particular, fasteners 422 used to secure the mounting feet 114 to the first and second side frame members 202 and, 204 can be selectively moved (i.e., slid) within the fastener slots 420 to reposition the mounting feet 114 at a desired fore-aft position along the first side frame member 202 and/or second side frame member 204. When the mounting foot 114 is in the desired fore-aft position relative to the respective side frame member, the fasteners 422 can be tightened or otherwise secured to the respective side frame member to inhibit movement of the mounting foot 114.

The cross frame member 206 also includes elongate fastener slots 420 (shown in FIG. 5) that enable other components of the frame assembly 104 to be coupled to the frame body 116 at selectively variable positions. The fastener slots 420 on the cross frame member 206 are elongate in a horizontal direction perpendicular to the fore-aft direction 112, referred to herein as a lateral direction. In the exemplary embodiment, the fastener slots 420 are T-shaped slots that are sized and shaped to receive one end of a fastener (e.g., fastener 510) therein, and to inhibit rotation of the fastener. More specifically, the fastener slots 420 are sized and shaped to receive the head of a bolt (e.g., a hex head bolt), and to inhibit rotation of the bolt as a corresponding nut is tightened to the bolt. In other embodiments, the fastener slots 420 may have any other suitable configuration that enables the frame assembly 104 to function as described herein.

The frame body 116, including the first side frame member 202, the second side frame member 204, and the cross frame member 206, may be constructed from any suitable material(s) that enable the frame assembly 104 to function as described herein. In the exemplary embodiment, each of the first side frame member 202, the second side frame member 204, and the cross frame member 206 is constructed from slotted extruded aluminum alloy, and each has a generally rectangular configuration. The slotted extruded aluminum alloy defines at least one T-shaped slot on each surface. In other embodiments, one or more of the first side frame member 202, the second side frame member 204, and the cross frame member 206 may be constructed from a material other than slotted extruded aluminum alloy.

Referring again to FIGS. 1 and 2, the frame assembly 104 also includes an actuator mounting assembly 122 and a sensor mounting arm 124. The actuator mounting assembly 122 is coupled to the frame body 116 (specifically, to the cross frame member 206), and the sensor mounting arm 124 is coupled to the actuator mounting assembly 122. As described further herein, the robot pedal actuator 108 is adjustably coupled to the frame body 116 by the actuator mounting assembly 122, and the position sensor 110 is adjustably coupled to the frame body 116 by the sensor mounting arm 124. The selectively adjustable position of the robot pedal actuator 108 and the sensor mounting arm 124 provided by the frame assembly 104 facilitates positioning the robot pedal actuator 108 and the sensor mounting arm 124 at optimal positions and orientations within a vehicle to obtain accurate test measurement data.

Figure 5:
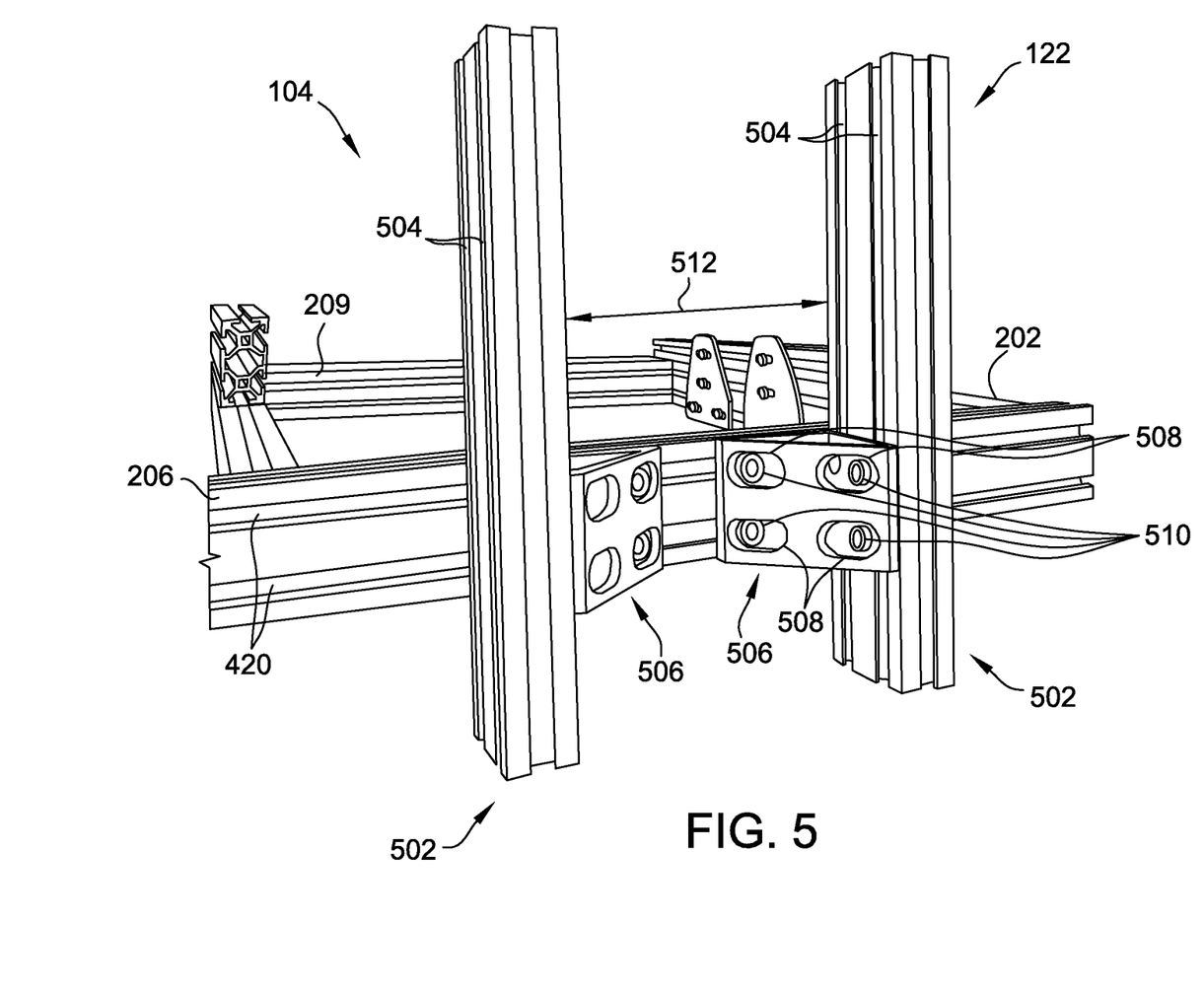
FIG. 5 is a front perspective view of the frame assembly shown in FIG. 1 and illustrating details of an exemplary actuator mounting assembly of the frame assembly.
Figure 6:
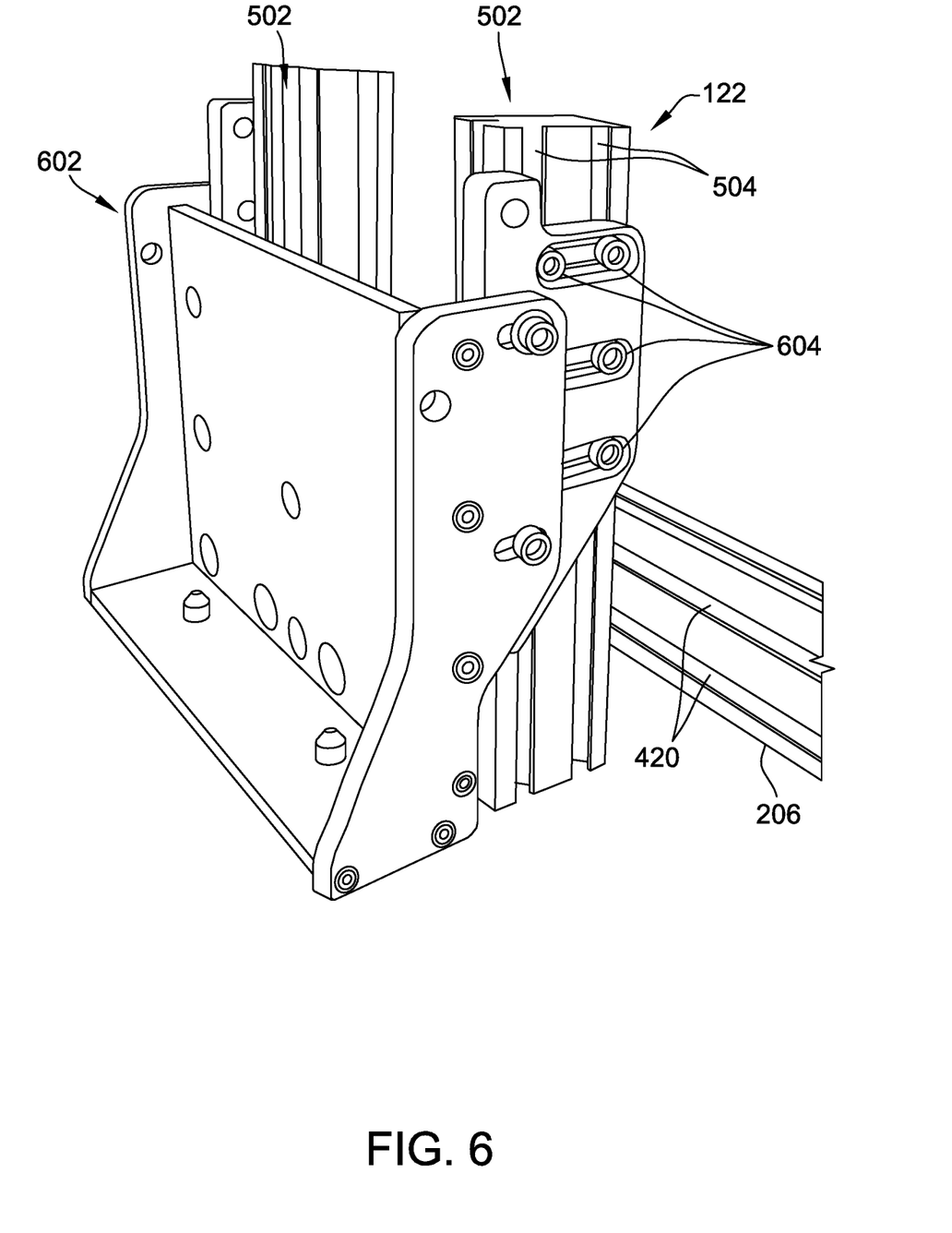
FIG. 6 is another perspective view of the frame assembly shown in FIG. 5 and including a mounting plate of a vehicle test fixture connected to the actuator mounting assembly.

With additional reference to FIG. 5, the actuator mounting assembly 122 includes vertically-oriented mounts 502 coupled to the cross frame member 206. In the exemplary embodiment, two vertically-oriented mounts 502 are used, although other embodiments may include more than or less than two mounts. The mounts 502 couple to the vehicle test fixture 102, specifically, to a mounting plate 602 (FIG. 6) of the robot pedal actuator 108. More specifically, each mount 502 defines at least one elongate fastener slot 504 sized and shaped to receive at least one fastener 604 (shown in FIG. 6) therein. Each slot 504 is elongate in the vertical direction such that the vehicle test fixture 102 is coupleable to the actuator mounting assembly 122 at different vertical positions.

Additionally, each mount 502 is independently and selectively adjustable horizontally and vertically relative to the cross frame member 206. In the illustrated embodiment, for example, each mount 502 is coupled to the cross frame member 206 by a respective angle bracket 506. The angle bracket 506 is selectively adjustable horizontally along a length of the cross frame member 206, and each mount 502 is selectively adjustable vertically relative to its corresponding angle bracket 506. Each angle bracket 506 includes a plurality of fastener openings 508 for receiving an angle bracket fastener 510 therein. At least one of the angle bracket fasteners 510 extends through a fastener opening 508 of the angle bracket 506, and into one of the fastener slots 420 of the cross frame member 206 to couple the angle bracket 506 to the cross frame member 206. Each angle bracket 506 can be independently adjusted horizontally by sliding the at least one angle bracket fastener 510 along the fastener slot 420 to a desired position, and then tightening the angle bracket fastener 510 to secure the angle bracket 506 in place. Accordingly, a width or spacing 512 between the mounts 502 can be selectively adjusted to accommodate vehicle test fixture mounting plates with different widths. Additionally, a horizontal position of the mounts 502 and the actuator mounting assembly 122 can be selectively adjusted.

Each of the mounts 502 is coupled to a respective one of the angle brackets 506 by at least one angle bracket fastener 510 extending through a fastener opening 508 of the angle bracket 506 and into one of the fastener slots 504. Each mount 502 can be independently adjusted vertically by sliding the mount 502 relative to the angle bracket 506 while the at least one angle bracket fastener 510 is loosened, and subsequently tightening the angle bracket fastener 510 after the mount 502 is in a desired vertical position to secure the mount 502 in place. Accordingly, a vertical position of each mount 502 relative to the cross frame member 206 and frame body 116 can be selectively adjusted to allow greater variability in the vertical mounting height of vehicle test fixtures.

Figure 7:
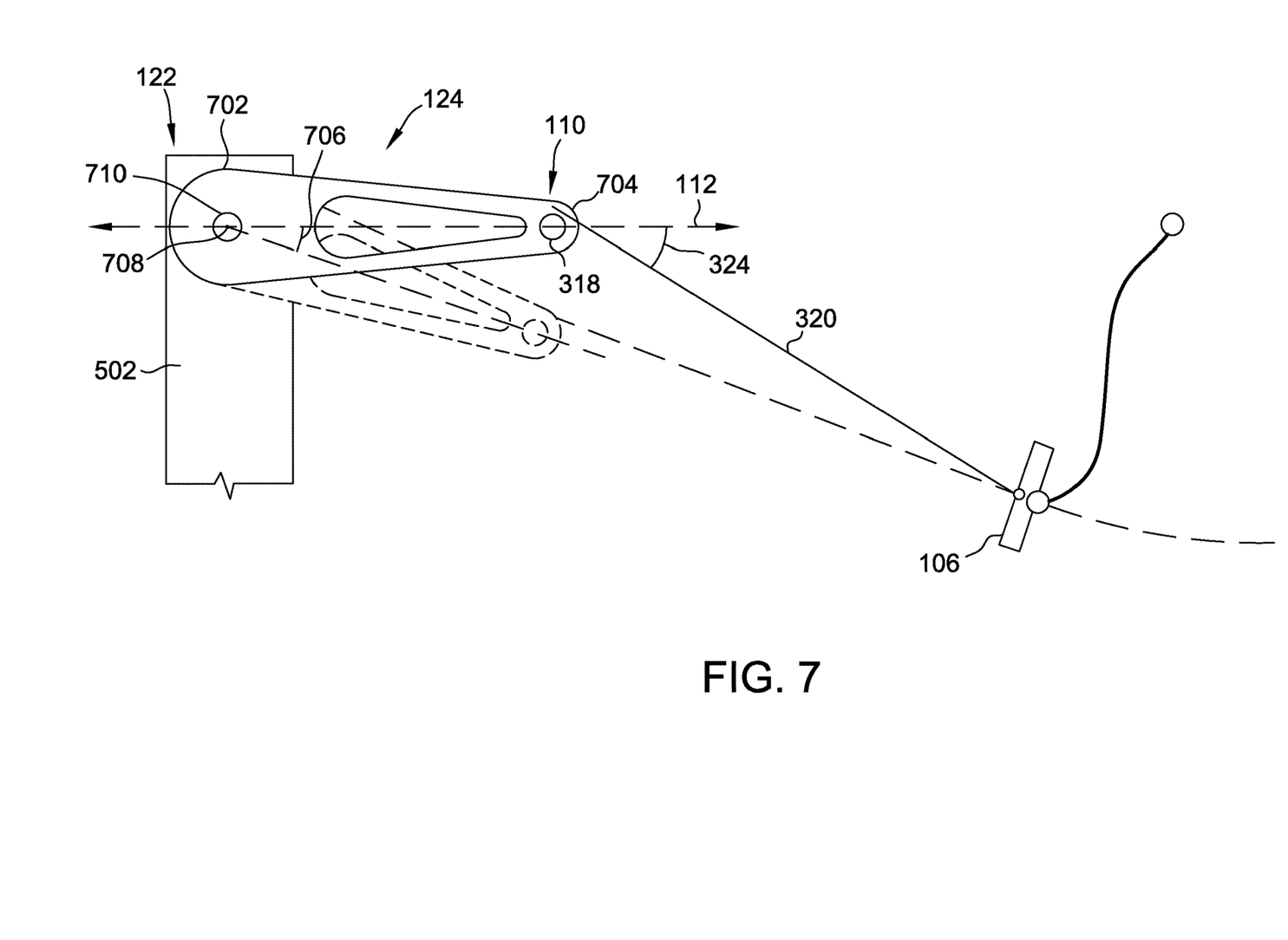
FIG. 7 is a side schematic view of a portion of the frame assembly shown in FIG. 1 and illustrating details of an exemplary sensor mounting arm of the frame assembly.

With additional reference to FIG. 7, the sensor mounting arm 124 extends from a first end 702 attached to the actuator mounting assembly 122, away from the frame body 116, to a second, free end 704 that attaches to the position sensor 110. The first end 702 of the sensor mounting arm 124 is coupled to one of the mounts 502 in the exemplary embodiment, although in other embodiments, the first end 702 of the sensor mounting arm 124 may be coupled to more than one mount 502. In yet other embodiments, the sensor mounting arm 124 may be coupled to a portion of the frame assembly 104 other than the actuator mounting assembly 122, such as to the frame body 116.

In the exemplary embodiment, the sensor mounting arm 124 is pivotably coupled to the actuator mounting assembly 122 such that a pitch angle 706 of the sensor mounting arm 124 is selectively adjustable. More specifically, the sensor mounting arm 124 is rotatable about a horizontal axis 708 oriented perpendicular to the fore-aft direction 112 and parallel to the lateral direction of the vehicle. The sensor mounting arm 124 is illustrated in a first, substantially horizontal position in FIG. 7, in which the sensor mounting arm 124 has a pitch angle 706 of approximately 0°. The sensor mounting arm 124 is illustrated in broken lines a second position in FIG. 7, in which the sensor mounting arm 124 has a pitch angle 706 of approximately 20°.

The sensor mounting arm 124 may be coupled to the actuator mounting assembly 122 by any suitable fastener that enables the frame assembly 104 to function as described herein. In the embodiment illustrated in FIG. 7, the sensor mounting arm 124 is coupled to one of the mounts 502 by a pivot pin 710, about which the sensor mounting arm 124 is selectively rotatable. In other embodiments, the sensor mounting arm 124 may be coupled to the actuator mounting assembly 122 by more than one fastener. In some embodiments, for example, the first end 702 of the sensor mounting arm 124 includes one or more arcuate fastener slots sized and shaped to receive a fastener therein. The arcuate fastener slots have a common radius of curvature and are concentric with the horizontal rotation axis 708 of the sensor mounting arm 124 such that the pitch angle 706 of the sensor mounting arm 124 can be selectively adjusted by loosening the fasteners that extend through the arcuate fastener slots, rotating the sensor mounting arm 124 to a desired pitch angle 706, and tightening the fasteners to secure the sensor mounting arm 124 in place.

The position sensor 110 is coupled to the sensor mounting arm 124 at the second end 704 thereof. More specifically, the spool 318 is coupled to the second end 704 of the sensor mounting arm 124. The cable 320 extends from the spool 318 to the pedal 106 at the pitch angle 324. The pitch angle 324 of the cable 320 is selectively adjustable via the sensor mounting arm 124 such that the pitch angle 324 of the cable 320 can be aligned with the pitch angle 316 of the actuating arm 304 (FIG. 3). Aligning the cable 320 and the actuating arm 304 facilitates collecting accurate test measurement data from the position sensor 110 by ensuring that the displacement measured by the position sensor is along the same direction or path of motion as that of the actuating arm 304.

Figure 8:
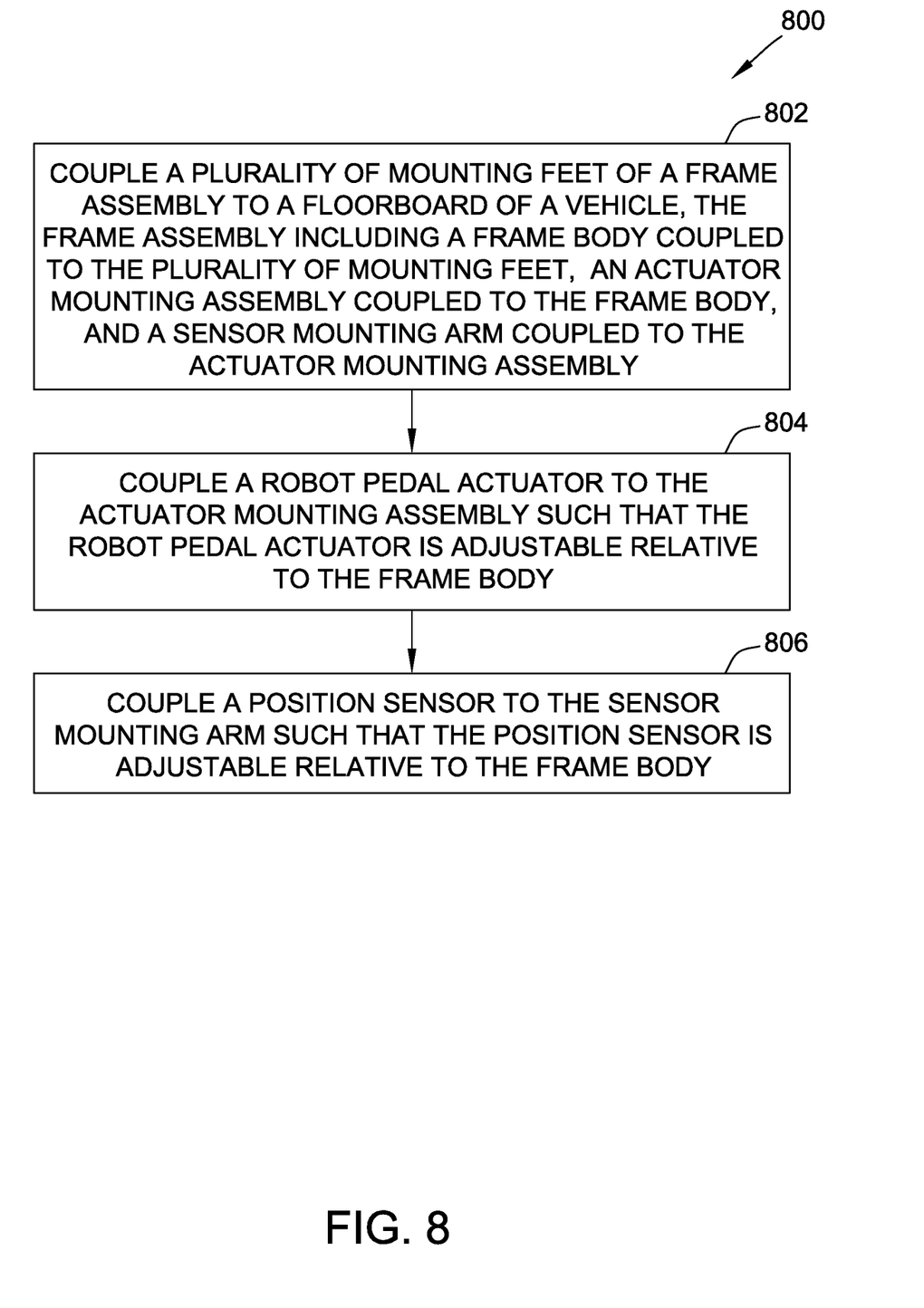
FIG. 8 is a flow chart of an exemplary method of assembling a test assembly for use with a vehicle.

FIG. 8 is a flow chart of an exemplary method 800 of assembling a test assembly for a vehicle, such as the test assembly 100. In the exemplary embodiment, the method 800 includes coupling 802 a plurality of mounting feet (e.g., mounting feet 114) of a frame assembly (e.g., frame assembly 104) to a floorboard of the vehicle (e.g., floorboard 118). The frame assembly includes a frame body (e.g., frame body 116) coupled to the plurality of mounting feet, an actuator mounting assembly (e.g., actuator mounting assembly 122) coupled to the frame body, and a sensor mounting arm (e.g., sensor mounting arm 124) coupled to the actuator mounting assembly. The method 800 also includes coupling 804 a robot pedal actuator (e.g., robot pedal actuator 108) to the actuator mounting assembly such that the robot pedal actuator is adjustable relative to the frame body. The robot pedal actuator is operable to depress a pedal of the vehicle. The method 800 further includes coupling 806 a position sensor (e.g., position sensor 110) to the sensor mounting arm such that the position sensor is adjustable relative to the frame body. The position sensor is configured to measure displacement of the pedal.

The method 800 may further include assembling the frame assembly, for example, by coupling the frame body to the plurality of mounting feet, coupling the actuator mounting assembly to the frame body, and/or coupling the sensor mounting arm coupled to the actuator mounting assembly. The frame assembly may be assembled prior to or subsequent to the plurality of mounting feet being coupled 802 to the floorboard of the vehicle.

In some embodiments, coupling 802 the plurality of mounting feet includes coupling the plurality of mounting feet to vehicle seat mounts on the vehicle floorboard.

In some embodiments, the robot pedal actuator includes an actuating arm, and the position sensor includes a cable-actuated position sensor that includes a spool coupled to the sensor mounting arm and a cable wound about the spool. In such embodiments, the method 800 may further include coupling a distal end of the actuating arm to the pedal of the vehicle such that the actuating arm is oriented at a pitch angle, coupling a distal end of the cable to the pedal, and adjusting a mounting position of the position sensor using the sensor mounting arm such that a pitch angle of the cable is aligned with the pitch angle of the actuating arm.

It should be readily understood that the method 800 may include additional, fewer, and/or alternative steps.

Embodiments of the frame assemblies and vehicle test assemblies described herein facilitate collecting precise test measurement data from vehicle test fixtures. For example, embodiments of the frame assemblies enable the mounting position of a vehicle test fixture to be selectively adjusted vertically and horizontally such that the vehicle test fixture can be aligned with a pedal of the vehicle to be tested. Aligning the test fixture with the vehicle pedal facilitates ensuring that an actuating arm of the test fixture applies force to the pedal along an optimal direction, and that a position sensor of the test fixture measures displacement of the pedal along the same direction as the actuating arm. This, in turn, facilitates precise and accurate test measurement data. Additionally, frame assemblies of the present disclosure provide a relatively rigid connection to the vehicle, as compared to at least some prior vehicle test assemblies. For example, embodiments of the frame assemblies are fixed directly to seat mounts on the vehicle floorboard, rather than to vehicle seats or seat tracks that allow vehicle seats to be selectively adjusted forward and rearward. Mounting the frame assembly directly to the vehicle seat mounts provides a rigid connection to the vehicle, and prevents movement of the frame assembly and test fixture during testing, particularly under heavy loads. Further, frame assemblies of the present disclosure facilitate use of different configurations of vehicle test fixtures within vehicles. For example, embodiments of the frame assemblies include horizontally-adjustable mounts for mounting the vehicle test fixtures to the frame assembly. The horizontally-adjustable mounts can accommodate vehicle test fixture mounting plates having different widths, and thereby accommodate different types of vehicle test fixtures to be mounted within the vehicle.

Exemplary embodiments of frame assemblies for use in mounting vehicle test fixtures within a vehicle are described above in detail. Although the systems herein are described and illustrated in association with a motor vehicle, the frame assemblies of the present disclosure may be used in any vehicle including, for example, aircraft, watercraft, and/or recreational vehicles (e.g., all-terrain vehicles). Moreover, it should also be noted that the components of the different embodiments are not limited to the specific embodiments described herein, but rather, aspects of each embodiment may be utilized independently and separately from other components and methods described herein.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A frame assembly for mounting a test fixture, said frame assembly comprising:
   a plurality of mounting feet configured to attach to a floorboard of a vehicle;
   a frame body coupled to said plurality of mounting feet, said frame body comprising:
      first and second side frame members spaced laterally apart from each other; and
      at least one cross frame member extending between said first and second side frame members;
   an actuator mounting assembly coupled to said frame body for coupling to the test fixture; and
   a sensor mounting arm coupled to said actuator mounting assembly, said sensor mounting arm extending from a first end coupled to said actuator mounting assembly, away from said frame body, to a second, free end configured for attachment to a position sensor.

2. The frame assembly of claim 1, wherein said sensor mounting arm is pivotably coupled to said actuator mounting assembly such that a pitch angle of said sensor mounting arm is selectively adjustable.

3. The frame assembly of claim 1, wherein said actuator mounting assembly comprises vertically-oriented mounts coupled to said at least one cross frame member and configured for coupling to the test fixture, wherein each mount is selectively adjustable horizontally and vertically relative to said at least one cross frame member.

4. The frame assembly of claim 3, wherein each mount is coupled to said at least one cross frame member by a respective angle bracket, wherein said angle bracket is selectively adjustable horizontally along a length of said at least one cross frame member, and wherein each mount is selectively adjustable vertically relative to said respective angle bracket.

5. The frame assembly of claim 3, wherein each mount defines an elongate slot sized and shaped to receive at least one mounting fastener of the test fixture therein, wherein said slot is elongate in the vertical direction such that the test fixture is coupleable to said actuator mounting assembly at different vertical positions.

6. The frame assembly of claim 1, wherein said plurality of mounting feet are configured to be fixed to vehicle seat mounts on the vehicle floorboard.

7. The frame assembly of claim 1, wherein said at least one cross frame member comprises a first cross frame member and a second cross frame member each extending between said first and second side frame members, wherein said first cross frame member is positioned forward of said second cross frame member.

8. A test assembly for a vehicle comprising:
   a frame assembly comprising:
      a plurality of mounting feet fixed to a floorboard of the vehicle;
      a frame body coupled to said plurality of mounting feet and extending at least partially around a seat of the vehicle;

an actuator mounting assembly coupled to said frame body; and a sensor mounting arm coupled to said actuator mounting assembly; and a test fixture comprising:

a robot pedal actuator adjustably coupled to said frame body by said actuator mounting assembly, said robot pedal actuator operable to depress a pedal of the vehicle; and a position sensor adjustably coupled to said frame body by said sensor mounting arm, said position sensor configured to measure displacement of the pedal.

9. The test assembly of claim 8, wherein said sensor mounting arm extends from a first end coupled to said actuator mounting assembly, away from said frame body, to a second, free end, and wherein said position sensor is coupled to said second end of said sensor mounting arm.

10. The test assembly of claim 8, wherein said sensor mounting arm is pivotably coupled to said actuator mounting assembly such that a pitch angle of said sensor mounting arm is selectively adjustable.

11. The test assembly of claim 8, wherein said position sensor comprises a cable-actuated position sensor comprising a spool coupled to said sensor mounting arm and a cable wound about said spool and extending from said sensor mounting arm to the pedal.

12. The test assembly of claim 11, wherein said robot pedal actuator comprises an actuator and an actuating arm having a first end coupled to said actuator and a second, distal end coupled to said pedal, wherein a pitch angle of said cable is selectively adjustable via said sensor mounting arm to align with a pitch angle of said actuating arm.

13. The test assembly of claim 8, wherein said frame body comprises:

first and second side frame members spaced laterally apart from each other; and at least one cross frame member extending between said first and second side frame members.

14. The test assembly of claim 13, wherein said actuator mounting assembly comprises vertically-oriented mounts coupled to said at least one cross frame member, said test fixture coupled to said vertically-oriented mounts, wherein each mount is selectively adjustable horizontally and vertically relative to said at least one cross frame member.

15. The test assembly of claim 14, wherein each mount is coupled to said at least one cross frame member by a respective angle bracket, wherein said angle bracket is selectively adjustable horizontally along a length of said at least one cross frame member, and wherein each mount is selectively adjustable vertically relative to said respective angle bracket.

16. The test assembly of claim 14, wherein each mount defines an elongate slot sized and shaped to receive at least one mounting fastener of said test fixture therein, wherein said slot is elongate in the vertical direction such that said test fixture is coupleable to said actuator mounting assembly at different vertical positions.

17. The test assembly of claim 8, wherein said plurality of mounting feet are fixed to vehicle seat mounts on the vehicle floorboard.

18. A method of assembling a test assembly for a vehicle, said method comprising:

coupling a plurality of mounting feet of a frame assembly to a floorboard of the vehicle, wherein the frame assembly includes a frame body coupled to the plurality of mounting feet, an actuator mounting assembly coupled to the frame body, and a sensor mounting arm coupled to the actuator mounting assembly;

coupling a robot pedal actuator to the actuator mounting assembly such that the robot pedal actuator is selectively adjustable relative to the frame body, wherein the robot pedal actuator is operable to depress a pedal of the vehicle; and coupling a position sensor to the sensor mounting arm such that the position sensor is adjustable relative to the frame body, wherein the position sensor is configured to measure displacement of the pedal.

19. The method of claim 18, wherein coupling a plurality of mounting feet of a frame assembly to a floorboard of the vehicle comprises coupling the plurality of mounting feet to vehicle seat mounts on the vehicle floorboard.

20. The method of claim 18, wherein the robot pedal actuator includes an actuating arm, and wherein the position sensor includes a cable-actuated position sensor including a spool coupled to the sensor mounting arm and a cable wound about the spool, said method further comprising:

coupling a distal end of the actuating arm to the pedal of the vehicle such that the actuating arm is oriented at a pitch angle;

coupling a distal end of the cable to the pedal; and adjusting a mounting position of the position sensor using the sensor mounting arm such that a pitch angle of the cable is aligned with the pitch angle of the actuating arm.

* * * * *